United States Patent [19]

Kawarabayashi et al.

[11] Patent Number: 4,745,799
[45] Date of Patent: May 24, 1988

[54] CONTROL DEVICE FOR CHASSIS DYNAMOMETER SYSTEM

[75] Inventors: Shigeyuki Kawarabayashi; Hiromi Kaneko, both of Minami, Japan

[73] Assignee: Horiba, Ltd., Kyoto, Japan

[21] Appl. No.: 907,998

[22] Filed: Sep. 16, 1986

[30] Foreign Application Priority Data

Nov. 9, 1985 [JP] Japan ............................ 60-251525

[51] Int. Cl.$^4$ .................................................. G01M 15/00
[52] U.S. Cl. ...................................................... 73/117
[58] Field of Search ................. 73/117, 862.16, 862.18; 364/148

[56] References Cited

U.S. PATENT DOCUMENTS 3,333,463  8/1967  Hollinghurst ........................ 73/117
4,327,578  5/1982  D'Angelo .
4,382,388  5/1983  Ono ................................ 73/862.18

Primary Examiner—Jerry W. Myracle
Attorney, Agent, or Firm—Wenderoth, Lind & Ponack

[57] ABSTRACT

A control device for a chassis dynamometer system which outputs a control signal for controlling a dynamometer on the basis of a control equation having parameters including a sensed torque and a sensed rotational speed of the dynamometer and an inertia of a vehicle to be tested and a mechanical inertia of the dynamometer system and including control coefficients, the control signal controlling said dynamometer so as to control the mechanical force to be absorbed therein when the dynamometer is connected to a rotating roller on which a driving wheel of the vehicle to be tested is placed via a shaft which is provided with a flywheel. The control device includes a circuit for automatically adjusting the control coefficients of the control equation utilized in the control device in accordance with changes in the mechanical inertia of said dynamometer system. The circuit for adjusting the control coefficients includes either a circuit for calculating the control coefficients on the basis of a function obtained from a model matching technique or a circuit for automatically adjusting the control coefficients which calculates the control coefficients on the basis of a regression function obtained experimentally.

5 Claims, 4 Drawing Sheets

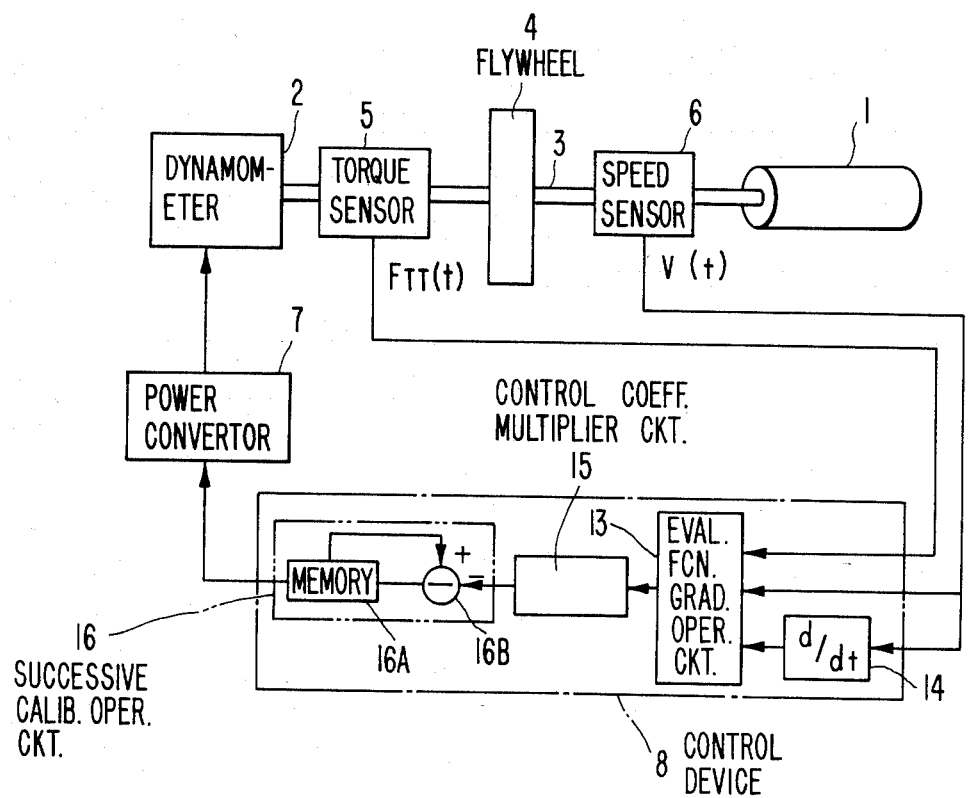

CONTROL DEVICE FOR CHASSIS DYNAMOMETER SYSTEM

BACKGROUND OF THE INVENTION

1. Field of the Invention

The present invention relates to a control device for one kind of vehicle running simulator used in a motor vehicle plant and a vehicle repair shop, that is to say, a chassis dynamometer capable of simulating a running condition of a vehicle on an actual road while having a car body stand still by absorbing a force generated by the vehicle. More particularly, the present invention relates to a chassis dynamometer system adapted to form a control signal for the dynamometer on the basis of a control equation comprising desired parameters such as signals detected by a torque sensor and a speed sensor, the inertia of vehicle and a mechanical inertia of a system and control coefficients, in order to control a force to be absorbed by the dynamometer connected to a rotating roller, on which a driving wheel of the vehicle to be tested is placed in an interlocked manner through a shaft provided with a flywheel.

2. Description of the Prior Art

The general rough construction of a chassis dynamometer system is generally shown in a block diagram (FIG. 5).

Referring now to FIG. 5, reference numeral 1 designates a rotating roller on which a driving wheel of a vehicle to be tested is placed; numeral 2 designates a dynamometer used as a power-absorption device connected to said rotating roller 1 in an interlocked manner through a shaft 3; numerals 4, 5 and 6 respectively designate a flywheel, a torque sensor and a speed sensor mounted on the shaft 3; numeral 7 designates an electrical power convertor adapted to electrically absorb a force corresponding to a difference between a force generated by the vehicle and a force based on a mechanical inertia of the system by the rotating roller 1, the shaft 3, the flywheel 4 and by controlling a field current or an excitation current to the dynamometer 2 on the basis of a control signal output from a control device 8. In short, this chassis dynamometer system is adapted to absorb a force generated by the vehicle by combining a mechanical inertia-adjustment method with an electrical power-adjustment method, the mechanical inertia being set in a switched-over manner by switching-over a weight of the flywheel 4 according to the type of vehicle, and an electrical force of the dynamometer 2 being suitably adjusted by the control device 8. The control device 8 has included one type using a control method which operates on the basis of a speed-related equation and one type using a control method which operates on the basis of a torque-related equation, but recently it has been found that the latter control method which operates on the basis of the torque-related equation is advantageous in view of its control characteristics when the system is accelerated.

The control method on the basis of the torque-related equation includes one in combination of a feedforward control and a feedback control as already proposed in now abandoned U.S. application Ser. No. 624,962 to Kawarabayashi and one minimizing an evaluation function by a steepest descent method as disclosed in co-pending U.S. application Ser. No. 634,117 to Kawarabayashi, now U.S. Pat. No. 4,656,576.

FIG. 6 shows one example of a DC chassis dynamometer having the conventional construction in which the former control method in combination with a forwardback control and a feedback control is adopted.

That is to say, in many cases with this construction, a force $F_{VEH}(t)$ generated by the vehicle to be tested at a time t is measured by an output $F_{TT}(t)$ of the torque sensor 5 while a speed $V(t)$ is measured by the speed sensor 6. In addition, these measured values $F_{TT}(t)$, $V(t)$ are put in a feedforward control circuit 9 and an error-function operational circuit 10 in the control device 8.

In the feedforward control circuit 9, a force $F_{PAU}(t+\Delta t)$ to be absorbed by the dynamometer 2 in the subsequent step (at a time $t+\Delta t$) is given from said measured value $F_{TT}(t)$, $V(t)$ and various kinds of parameter set at a time t by the following equation:

$$F_{PAU}(t + \Delta t) = \frac{I_m + I_r}{I} RL(V) + \frac{I_e}{I}\left\{ F_{TT}(t) + I_m \frac{dV}{dt} + L_m(V) \right\}$$

wherein $I_m$: A set value of mechanical inertia (approximately represented by an inertia of the flywheel 4);
$I_r$: An inertia of a roller in the dynamometer 2;
$I$: An inertia of a vehicle to be tested;
$I_e$: An electrical inertia $\{=I-(I_m+I_r)\}$
$RL(V)$: Road load($=A+BV+CV^x$; wherein A, B, C are constants);
$L_m(V)$: A mechanical loss of the flywheel 4;
$V$: A speed $V(t)$ of a vehicle at a time t.

On the other hand, an error function is operated on in said error-function operating circuit 10. The error function is expressed by the following equations for determining an integrated value of a difference between an actual predicted output value $F_{PAU}'(t+\Delta t)$ of the dynamometer 2 including an inertia of the roller 1 and the desired value $F_{TT}+L_m(V)$.

$$\int_0^t \epsilon(t)dt = \int_0^t \{F_{TT}(t) + L_m(V) - F_{PAU}'(t + \Delta t)\}dt$$

$$= \int_0^t \{F_{TT}(t) + L_m(V) - RL(V)\}dt - (I - I_m) \cdot V$$

An error signal from this error-function operating circuit 10 is put in an adder 12 through a feedback control circuit 11 which carries out a control action so as to make the error signal 0, where the signal $F_{PAU}(t+\Delta t)$ from the feedforward control circuit 9 is calibrated. In the case where the feedback control circuit 11 carries out, for example, a PI control, a calibrated signal is expressed by the following equation:

$$F_{PC}(t) = F_{PAU}(t + \Delta t) + K_p \cdot x(t) + K_I \int_0^t x(t)dt$$

wherein $x(t) = \int_0^t \epsilon(t)dt;$ $K_p$: A control coefficient of a proportional term of the PI control;
$K_I$: A control coefficient of an integration term of the PI control;

The above described calibrated signal $F_{pc}(t)$ controls the electrical power convertor 7 and outputs the field current or the excitation current through the dynamometer 2, whereby the dynamometer 2 is controlled so as to absorb a mechanical force output from the vehicle to be tested.

In addition, FIG. 7 shows one example of a DC chassis dynamometer having the conventional construction in which a control method is adopted so as to minimize the evaluation function by the latter steepest descent method.

That is to say, with this construction, a force $F_{VEH}(t)$ generated by the vehicle to be tested at a time t is measured as the output $F_{TT}(t)$ by the torque sensor 5 and fed to an evaluation function gradient operational circuit 13 in the control device 8 while the speed V(t) is measured by the speed sensor 6 and fed to said evaluation function gradient operational circuit 13 through an acceleration-operating differential circuit 14 in the control device 8.

In this evaluation function gradient operational circuit 13, a gradient $\nabla J$ of the evaluation function $J = \{F_{TT}(t) + L_m(V) - F_{PAU'}(t+\Delta t)\}^2$, which is used as a function corresponding to the above described error function, is given on the basis of the following equation:

$$\nabla J = F_{TT}(t) + L_m(V) - RL(V) - (I - I_m)dv/dt$$

wherein $I_m$: A set value of a mechanical inertia (approximately represented by an inertia of the flywheel 4);
I: An inertia of the vehicle to be tested;
RL(V): Road load ($=A + BV\ CV^x$; wherein A, B, C are constants);
$L_m(V)$: A mechanical loss of the flywheel 4;
V : V(t);
$F_{PAU'}(t+\Delta t$ : The actual predicted output value of the dynamometer 2.

The output signal (the gradient $\nabla J$) from the evaluation function gradient operational circuit 13 is fed to a control coefficient multiplier circuit 15 and $\alpha \cdot \nabla J$, where $\alpha$ is a small control coefficient, is output from the control coefficient multiplier circuit 15 and fed to a successive calibration operational circuit 16.

Thereupon, the successive calibration operational circuit 16 outputs a control signal $F_{PAU}(t+\Delta t)$ in the next step by the following equation on the basis of the steepest descent method from the control signal $F_{PAU}(t)$ in the preceding step accumulated in a memory 16A and the $\alpha \cdot \nabla J$.

$$\begin{aligned} F_{PAU}(t + \Delta t) &= F_{PAU}(t) - \alpha \cdot \nabla J \\ &= F_{PAU}(t) - \alpha\{F_{TT}(t) + L_m(V) - \\ &\quad RL(V) - (I - I_m)dv/dt\} \end{aligned}$$

In the successive calibration operational circuit 16, comprising the memory 16A and a feedback subtracter 16B, a control signal $P_{PAU}(t+\Delta t)$ of the electrical power convertor 7 is subjected to a successive calibrational operation by the steepest descent method as described above so as to meet changes of the system such as an acceleration and a deceleration, whereby a field current or an excitation current supplied to the dynamometer 2 is controlled and the dynamometer 2 generates a force absorbing a mechanical force output by the vehicle to be tested within an appointed time.

However, in an operation control device of a chassis dynamometer having the above described conventional construction, whether using a control method in combination with a feedforward control and a feedback control as shown in said FIG. 6 or using a control method minimizing an evaluation function using the steepest descent method as shown in said FIG. 7, use control coefficients ($K_p$ and $K_I$ in the control method in combination with a feedforward control and a feedback control and $\alpha$ in the control method minimizing an evaluation function by the steepest descent method) in the control equation comprising desired parameters, such as a torque, a speed, an inertia of a vehicle and a mechanical inertia of a system, and these control coefficients are set at certain appointed values, so that disadvantages such as instability, significant delay in the settling time of the control system and oscillation have occurred according to a change of a measuring condition due to a difference in the kind of a vehicle and the like. In the case of such an instability, it is necessary to adjust the control coefficients. Such an adjustment must be carried out by a trial and error method, and it has been very difficult to carry out an exact adjustment.

SUMMARY OF THE INVENTION

The present invention was achieved in view of the above described conventional actual state. It is an object of the present invention to easily maintain a system under an always stabilized system which is superior in its response regardless of a change of a measuring condition due to a difference in the kind of vehicle and the like by designing the system so that control coefficients in the control equation may be automatically set at values optimum or nearly optimum for achieving a stabilized control state.

In order to achieve the above described object, an operational control device of a chassis dynamometer according to the present invention having a fundamental construction as described at the beginning is characterized by being provided with a means for automatically adjusting control coefficients in a control equation in correspondence with a change of a mechanical inertia in the case where the mechanical inertia is changed.

The present invention was achieved on the basis of a discovery that a change of values of control coefficients so as to be optimum or nearly optimum for achieving a stabilized state is largely (almost uniquely) dependent upon a change of the set value of a mechanical inertia, as understood from the description of the preferred embodiments described later, thereby developing a control device for a chassis dynamometer provided with a means for automatically adjusting the control coefficients in the control equation in correspondence with a change in mechanical inertia, as described above.

Since a control device of a chassis dynamometer system according to the present invention is provided with a means for automatically adjusting control coefficients in a control equation comprising desired parameters, such as a torque, a speed, an inertia of a vehicle and a mechanical inertia of a system, and since the control coefficients are to be standards of the control in correspondence with a change in mechanical inertia whether a control method in combination with a feedforward control and a feedback control is used or a control method minimizing an evaluation function by the steepest descent method is used, the control coefficients can be automatically adjusted and always set at values which are optimum or nearly optimum regardless of a change in a measuring condition such as a change in mechanical inertia which is suitably set in correspondence with a kind of vehicle, so that the system can be very easily maintained under an always stabilized and superior control state without requiring a troublesome and difficult manual adjusting operation.

BRIEF DESCRIPTION OF THE DRAWINGS

The preferred embodiments of a control device of a chassis dynamometer system according to the present invention are shown in FIGS. 1 to 4, in which.

Figure 5:
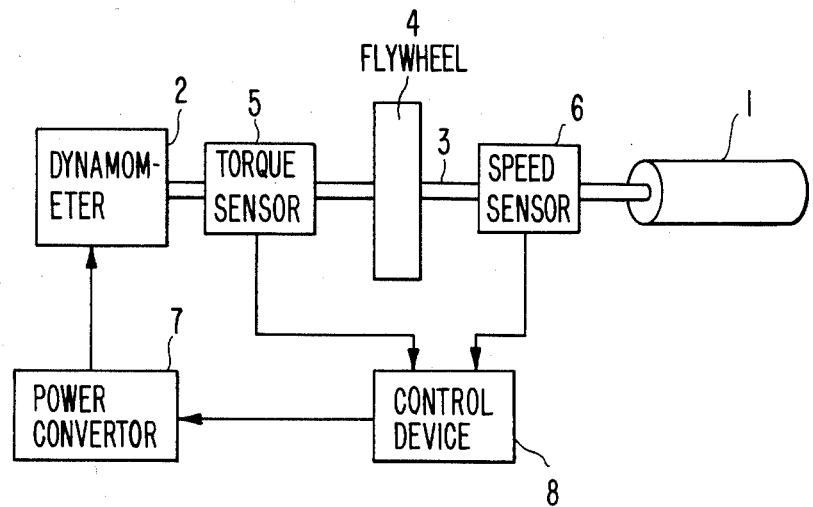
Figure 6:
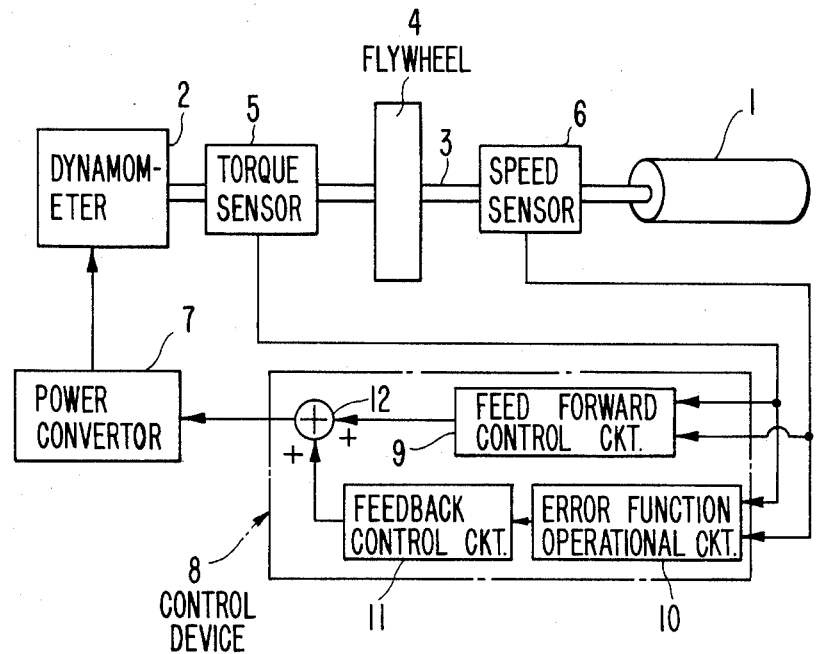

In addition, the problems incidental to the prior art are described in FIGS. 5 to 7 in which:

FIG. 5 is a general block diagram showing a control device of a chassis dynamometer system;

FIG. 6 is a general block diagram showing a device in which a control method in combination with a feedforward control and a feedback control is adopted; and FIG. 7 is a general block diagram showing a device in which a control method minimizing an evaluation function by a steepest descent method is used.

DESCRIPTION OF THE PREFERRED EMBODIMENTS

The preferred embodiments of the present invention will be below described with reference to FIGS. 1-4.

Figure 1:
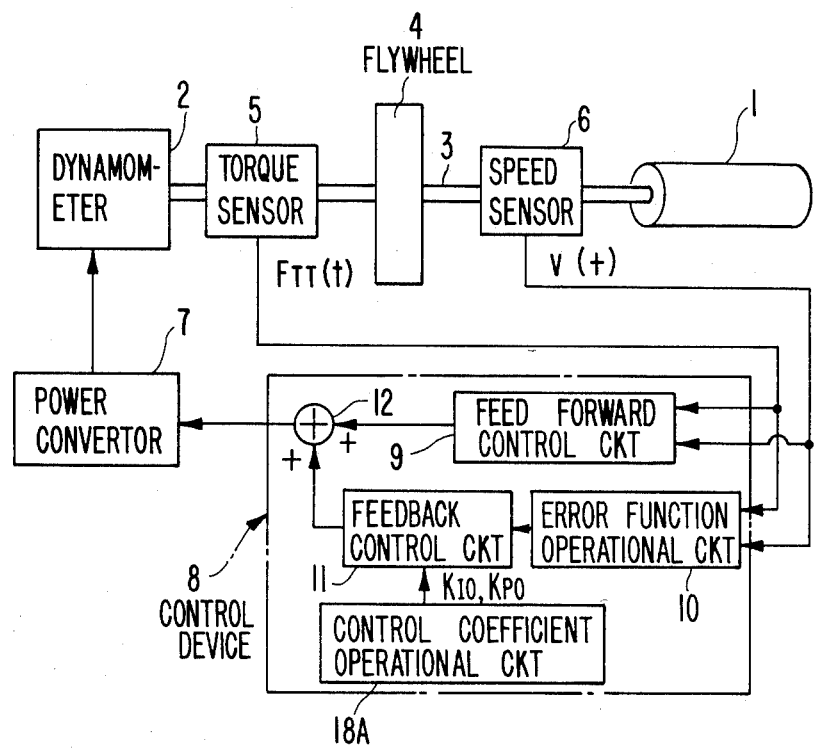
FIG. 1 is a general block diagram showing a first preferred embodiment of the present invention.

FIG. 1 shows a first preferred embodiment of the present invention in which the present invention is applied to a control device for a chassis dynamometer system using a control method in combination with a feedforward control and a feedback control.

Referring now to FIG. 1, constituent elements designated by reference numerals 1 to 7, 9, 10, and 12 correspond to those elements designated by the same reference numerals in the conventional device as shown in FIG. 6, and their description has been accordingly omitted.

The differences between a device according to this preferred embodiment of the present invention and the conventional device are as follows:

In the case of this preferred embodiment, a feedback control circuit 11 is adapted to carry out an IP control (but there is no essential difference in this respect). Control coefficients (a control coefficient $K_I$ of an integration term and a control coefficient $K_p$ of a proportional term) used for the operation in the feedback control circuit 11 are not set at appointed fixed values as in the conventional device but are adapted to be variable, and a control coefficient operational circuit 18A (i.e.—a means for automatically adjusting control coefficients), which calculates optimum control coefficients $K_{IO}$ and $K_{PO}$ which are optimum or nearly optimum for maintaining the system under an always stabilized control state are supplied to the feedback control circuit 11 even in the case where, for example, a set value of a mechanical inertia $I_m$ is switched over with a change in kind of vehicle so as to change control conditions.

The optimum control coefficients $K_{IO}$ and $K_{PO}$ to be determined in said control coefficients operational circuit 18A are given by the following equations in this preferred embodiment.

$$K_{IO} = k_a \cdot \frac{I_m + I_r}{T_a^2}$$

$$K_{PO} = k_b \cdot \frac{I_m + I_r}{T_a}$$

wherein $k_a$ and $k_b$ are constants. In this preferred embodiment, $k_a$ is set at 0.18 and $k_b$ at 0.60.

The above described operational equations of the optimum control coefficients $K_{IO}$ and $K_{PO}$ were obtained by using a model matching method in the following manner. The model matching method is a design technique in which the superior response and stability of a model control system are given to an object control system by matching a transfer function of the object control system to one equivalent to a transfer function of the model control system for which a condition having a superior response and stability is selected.

Now, since the feedback control circuit 11 in the device according to the present preferred embodiment uses an IP control method, its transfer function G(s) is expressed by the following equation:

$$G(s) = \frac{1}{1 + s \cdot \frac{a(s) + K_p}{K_I}}$$

wherein
$a(s) = a_0 + a_1 s + a_2 s^2$;
$a_0 = 0$;
$a_1 = (I_m + I_r)/K_a$;
$a_2 = T_a(I_m + I_r)/K_a$; and
s: Laplacian operator.

$T_a$ is a time-constant of the dynamometer 2 and $K_a$ is a gain.

Figure 2:
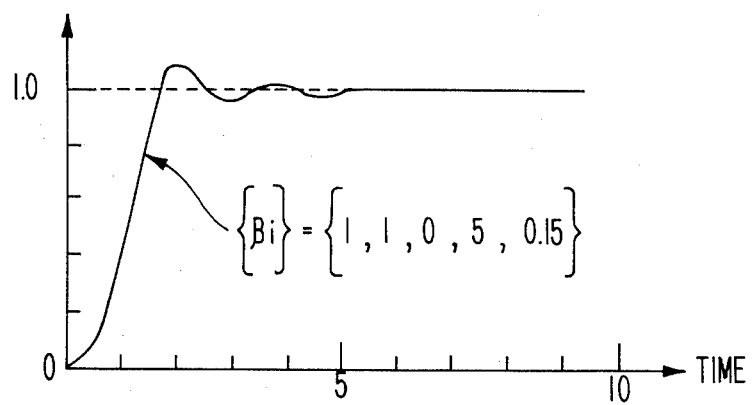
FIG. 2 is a graph used for explaining a model matching method.

On the other hand, in this preferred embodiment, a model control system having a superior response and stability as shown in FIG. 2 in a step response was selected as a reference model control system. The transfer function M(s) of this model control system is given by the following equation:

$$M(s) = \frac{1}{\beta_0 + \beta_1 \sigma s + \beta_2 \sigma^2 s^2 + \beta_3 \sigma^3 s^3}$$

wherein
$\beta_0 = 1$;
$\beta_1 = 1$;
$\beta_2 = 0.5$;
$\beta_3 = 0.015$; and
$\sigma = a_2 \beta_2 / a_1 \beta_3$ Accordingly, if $K_I$ and $K_p$ are obtained by setting G(s) equal to M(s), the operational equations of the above described optimum control coefficients $K_{IO}$ and $K_{PO}$ are obtained in the following manner:

$$K_I = \frac{a_1^3 \cdot \beta_3^2}{\beta_2^3 \cdot a_2^2} = 0.18 \cdot \frac{I_m + I_r}{T_a^2}$$
$$= K_{IO}$$

$$K_P = \frac{a_1^2 \cdot \beta_3}{\beta_2^2 \cdot a_2} = 0.60 \cdot \frac{I_m + I_r}{T_a}$$
$$= K_{PO}$$

In short, since the optimum control coefficients $K_{IO}$ and $K_{PO}$ given by the above described equations are functions of the mechanical inertia $I_m$ (both $I_r$ and $T_a$ are fixed values), the control coefficients $K_I$ and $K_P$ used in the feedback control circuit 11 can be automatically adjusted to be the optimum control coefficients $K_{IO}$ and $K_{PO}$ in accordance with the switchover of a set value of mechanical inertia $I_m$. Since the optimum control coefficients $K_{IO}$ and $K_{PO}$ are obtained on the basis of a model control system having a superior response and stability, also this control system can be operated under the condition which is superior in response and stability alike to the model control system.

In addition, although one embodiment of the present invention, uses the feedback control circuit 11 which operates in accordance with the control method described above, it goes without saying that the present invention is also applicable to the case where the feedback control circuit 11 uses other methods such as a PI control method.

Figure 3:
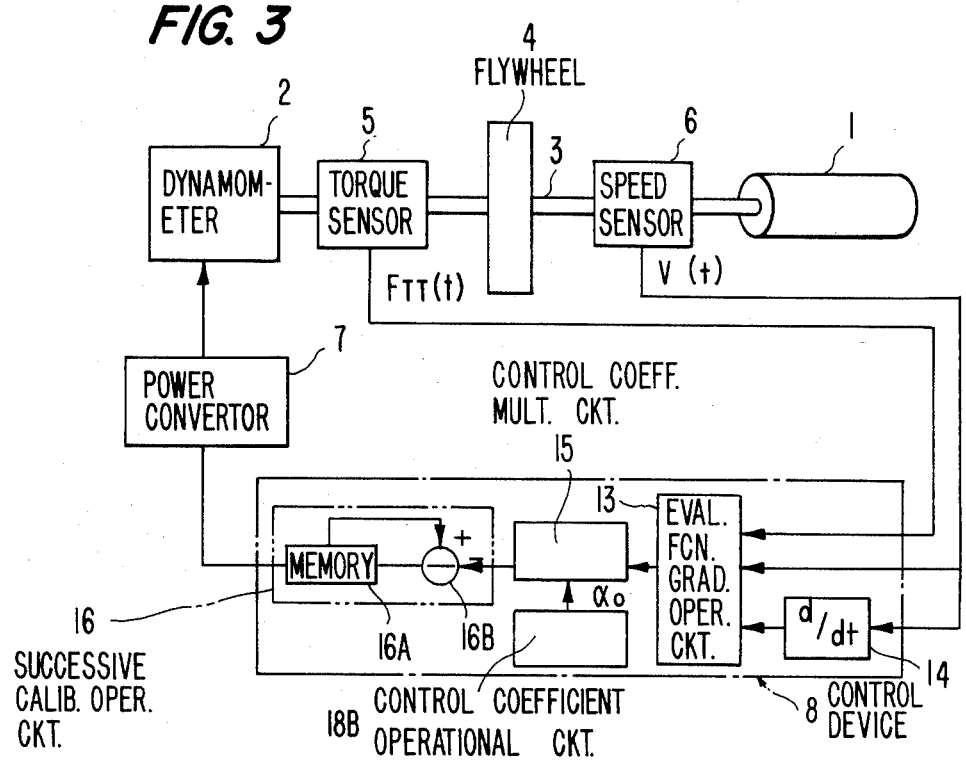
FIG. 3 is a general block diagram showing a second preferred embodiment of the present invention.

FIG. 3 shows a second preferred embodiment of the present invention which is applied to an operation control device for a chassis dynamometer using a control method minimizing an evaluation function by the steepest descent method.

In addition, referring to FIG. 3, constituent elements designated by reference numerals 1 to 7, 13 to 16, 16A and 16B correspond to those elements designated by the same reference numerals in the conventional device shown in FIG. 7, and a description thereof is accordingly omitted.

The differences between a device according to this preferred embodiment and the above described conventional device are as follows:

A control coefficient ($\alpha$) used for the operation in a control-coefficient multiplying device 15 is not set at an appointed fixed value as in the conventional device but is adapted to be variable, and a control coefficient operational circuit 18B (i.e.—a means for automatically changing a control coefficient), which calculates an optimum control coefficient $\alpha_o$ which is optimum or nearly optimum for maintaining the system under an always stabilized control state, supplies the control coefficient to the control coefficient multiplier circuit 16B even in the case where, for example, a set value of a mechanical inertia $I_m$ is switched over with a change in kind of vehicle to change control conditions.

The optimum control coefficient $\alpha_o$ to be determined in the control coefficient operational circuit 18B is given by the following equation in this preferred embodiment.

$$\alpha_o = \alpha(I_m, I)$$
$$= (c_o + c_1 I + c_2 I^2) I_m + (d_o + d_1 I + d_2 I^2)$$

wherein $c_o$, $c_1$, $c_2$, $d_o$, $d_1$, and $d_2$ are constants depending upon the control system.

Figure 4:
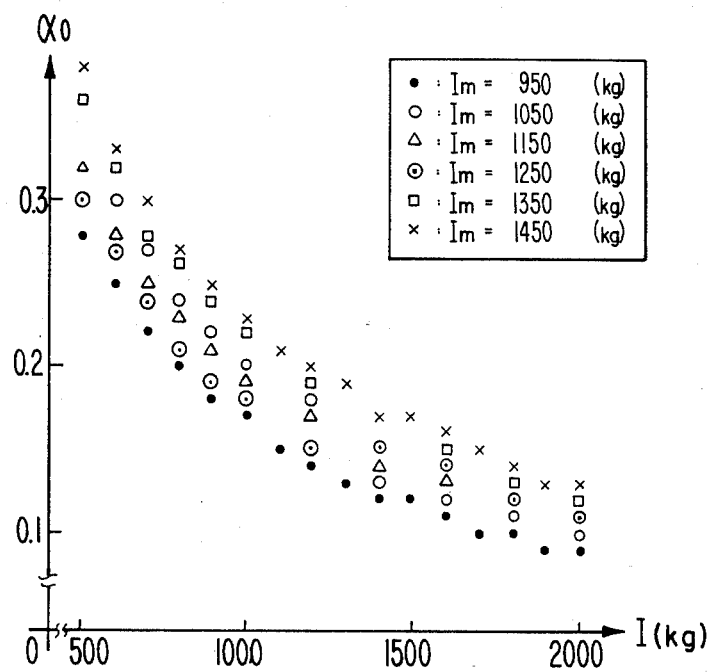
FIG. 4 is a graph showing experimental results of the simulation.

The above described operational equation of the optimum control coefficient $\alpha_o$ is a regression function obtained from a large number of simulation experiments by induction in the following manner:

FIG. 4 is a graph obtained by plotting the results obtained by investigating the optimum control coefficient $\alpha_o$ which is optimum or nearly optimum for the conditions, where an inertia $I$ of a vehicle to be tested is varied, thereby changing a set value of mechanical inertia $I_m$, using simulation experiments. It is obvious from this graph that the optimum control coefficient $\alpha_o$ can be at least formally expressed by a function comprising the inertia $I$ of the vehicle to be tested and the mechanical inertia $I_m$ as parameters. Moreover, to our convenience, in a remarkably simple fashion, a change of mechanical inertia $I_m$ has an influence such that a curve determined by a change of inertia $I$ of a vehicle to be tested may be parallelly transferred in a longitudinal axial direction. Thus, it is possible to easily identify an equation for giving the optimum control coefficient $\alpha_o$ in the above described form. Constants $c_o$, $c_1$, $c_2$, $d_o$, $d_1$, and $d_2$, determined by a control system in the equation for giving the optimum control coefficient $\alpha_o$, can be easily given by the use of, for example, at least squares method. In addition, the form of the equation for giving the optimum control coefficient $\alpha_o$ is not limited to the one described above but any form capable of roughly identifying the simulation experimental results can be used.

In short, if the inertia $I$ of a vehicle to be tested is set, the optimum control coefficient $\alpha_o$ given by the above described equation is expressed by a function of only the mechanical inertia $I_m$, and the control coefficient $\alpha$ used in the operation of the control coefficient multiplying circuit 15 is automatically adjusted to the optimum control coefficient $\alpha_o$ in accordance with the switchover of a set value of mechanical inertia $I_m$, whereby the control system can be operated under a condition having a superior response and stability.

In addition, it goes without saying that the control device 8 in each of the preferred embodiments can be also effected by a software processing technique utilizing a digital circuit or a microcomputer.

We claim:

1. A control device for a chassis dynamometer system including a torque sensing means and a rotational speed sensing means which outputs a control signal for controlling a dynamometer on the basis of a control equation having parameters including a sensed torque and a sensed rotational speed of said dynamometer and an inertia of a vehicle to be tested and a mechanical inertia of said dynamometer system and including control coefficients, said control signal controlling said dynamometer so as to control a mechanical force to be absorbed therein when said dynamometer is connected to a rotating roller on which a driving wheel of said vehicle to be tested is place via a shaft which is provided with a flywheel, said control device comprising a means for automatically adjusting said control coefficients of said control equation utilized in said control device in accordance with changes in said mechanical inertia of said dynamometer system.

2. A control device as recited in claim 1, wherein said means for adjusting said control coefficients includes means for calculating said control coefficients on the basis of a function obtained from a model matching technique.

3. A control device as recited in claim 2, wherein said function comprises the following two equations:

$$K_I = 0.18 \left[ \frac{I_m + I_r}{T_a^2} \right]$$

$$K_P = 0.06 \left[ \frac{I_m + I_r}{T_a} \right]$$

wherein $K_I$ and $K_P$ are said control coefficients and wherein $I_m$ is said mechanical inertia and said $I_r$ is an inertia of said roller and $T_a$ is a time constant of said dynamometer.

4. A control device as recited in claim 1, wherein said means for automatically adjusting said control coefficients includes means for calculating said control coefficients on the basis of a regression function obtained experimentally.

5. A control device as recited in claim 4, wherein said regression function comprises the following equation:

$$\alpha_0 = (C_0 + C_1 I + C_2 I^2) I_m + (d_0 + d_1 I + d_2 I^2)$$

wherein $C_0$, $C_1$, $C_2$, $d_0$, $d_1$, and $d_2$ are constants of said control device and $\alpha_0$ is said control coefficient and $I_m$ is said mechanical inertia and $I$ is said inertia of said vehicle to be tested.

* * * * *